(Model.)

G. A. BEIDLER.

COFFEE ROASTER.

No. 248,986. Patented Nov. 1, 1881.

3 Sheets—Sheet 1.

Witnesses,
Edwin L. Yewell
J. J. McCarthy

Inventor
George A. Beidler,
By C. M. Alexander,
Attorney.

(Model.)

3 Sheets—Sheet 2.

G. A. BEIDLER.

COFFEE ROASTER.

No. 248,986.

Patented Nov. 1, 1881.

Witnesses,
Edwin L. Yewell.
J. J. McCarthy.

Inventor
George A. Beidler,
By C. M. Alexander,
Attorney.

(Model.)

G. A. BEIDLER.
COFFEE ROASTER.

No. 248,986.                    Patented Nov. 1, 1881.

Witnesses,
Edwin L. Yewell,
J. J. McCarthy

Inventor
George A. Beidler,
By C. M. Alexander.
Attorney.

UNITED STATES PATENT OFFICE.

GEORGE A. BEIDLER, OF MIDDLETOWN, PENNSYLVANIA.

COFFEE-ROASTER.

SPECIFICATION forming part of Letters Patent No. 248,986, dated November 1, 1881.

Application filed August 25, 1881. (Model.)

*To all whom it may concern:*

Be it known that I, GEORGE A. BEIDLER, of Middletown, in the county of Dauphin, and in the State of Pennsylvania, have invented certain new and useful Improvements in Coffee-Roasters; and I do hereby declare that the following is a full, clear, and exact description thereof, reference being had to the accompanying drawings, and the letters of reference marked thereon, making a part of this specification.

This invention relates to coffee-roasters which may be made spherical, spheroidal, or of any shape approximating a sphere, and which are mounted on a frame so that they can be rotated or oscillated, as circumstances require.

My object is to improve this kind of coffee-roasters by the employment of a rotary cranked rod which is adapted for agitating the coffee inside of the roaster, and also for oscillating or rotating the roaster during the roasting process, and which is so applied to the roaster that it serves as the journal-supports for it, and may serve as the means for securing together the two sections forming the roaster.

Another object of my invention is to construct for the roasting-vessel a flanged reversible base or support adapted to be properly fitted in or over stove-holes of the various diameters adopted by the stove-trade, and to provide in such base slotted bearings for the crank-rod of the roasting-vessel which will allow the ready application to and removal of the roaster from its base-support. These with other features of my invention will be fully explained hereinafter.

To enable others skilled in the art to understand my invention, I will describe it with reference to the annexed drawings, in which—

Figure 1:
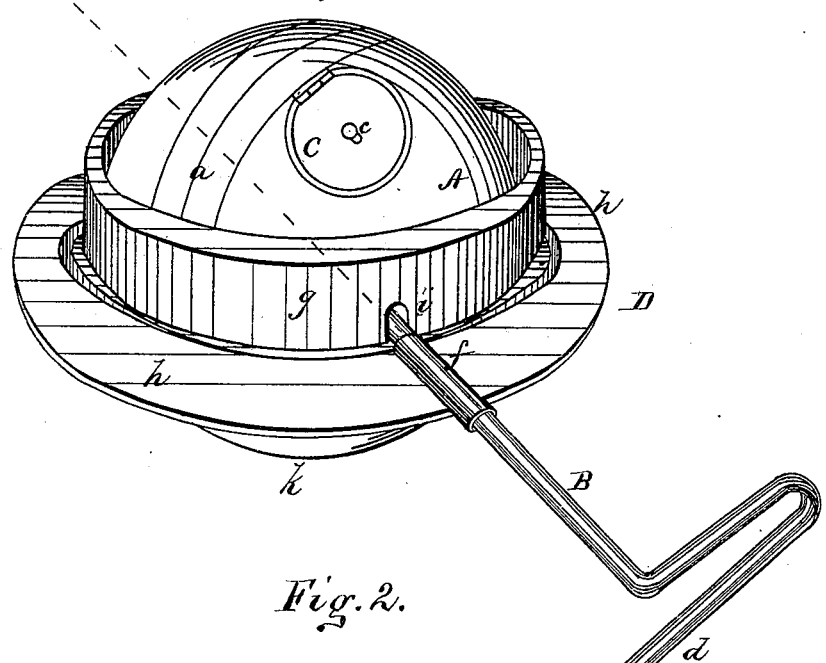
Figure 2:
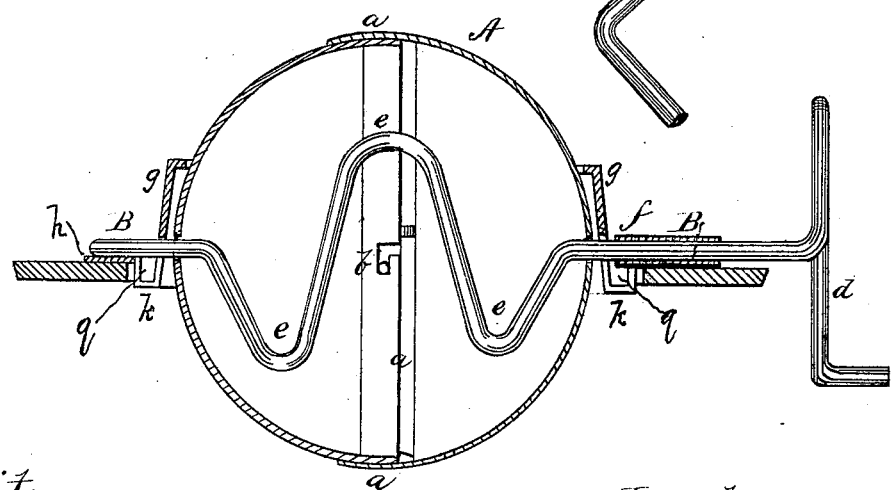
Figure 3:
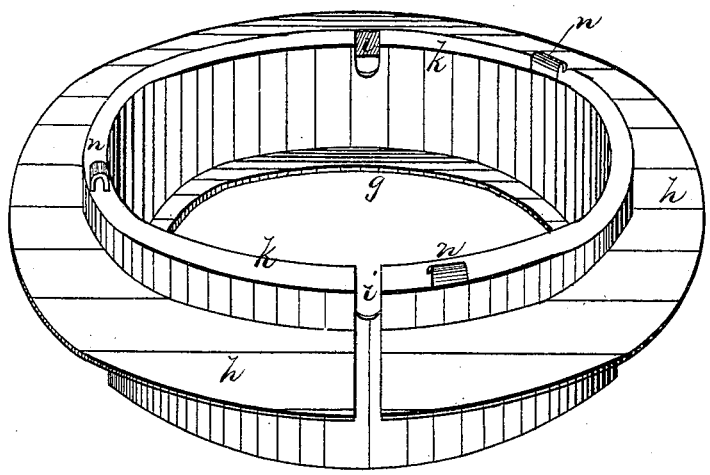
Figure 4:
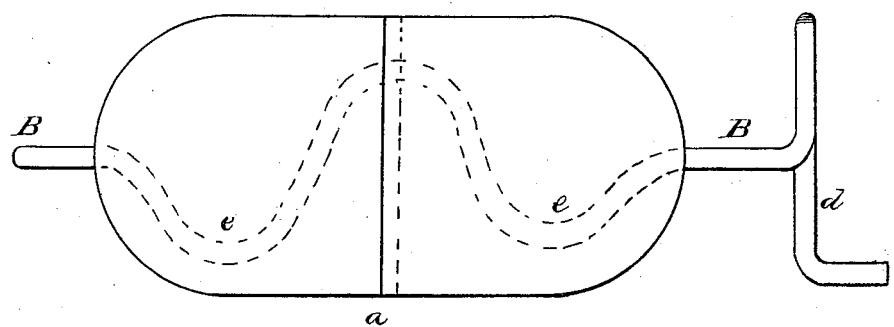
Figure 5:
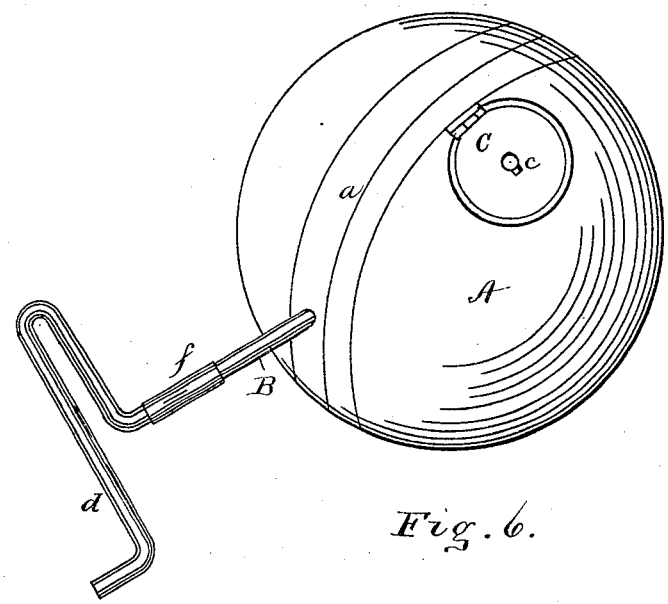
Figure 6:
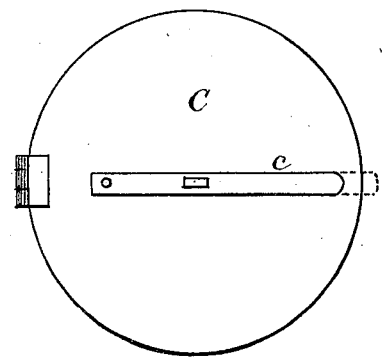

Figure 1 is a perspective view of a spherical coffee-roaster mounted on its base, which is represented with the smallest end up and with the cranked rod passing diametrically through the roasting-vessel at right angles to the plane of separation of its two halves. Fig. 2 is a diametrical section through the spherical vessel of Fig. 1, showing the cranked rod and its stirring-cranks, and also the reversible base resting upon a section of a stove-plate. Fig. 3 is a perspective view of the base-support for the roaster with its smallest collar down. Fig. 4 shows an elongated roasting-vessel adapted to part centrally. Fig. 5 is a perspective view of a spherical vessel, showing the cranked rod passed through it in the plane of the division of the two halves. Fig. 6 is an enlarged view of the door, showing its catch.

In the annexed drawings I have represented the roasting-vessel of a spherical form, and also of an oblate spheroidal form. This vessel A is composed of two parts or halves united by a lapped joint, a, and secured together by a bayonet-fastening, b, (shown in Fig. 2,) or by any other suitable means whereby tightness and security are afforded.

In Fig. 5 I have represented a crank-rod, B, passed through the interlapping flanges or edges of the two halves or hemispheres composing the roaster. This rod of itself will answer to hold the two halves together when the vessel is in its base, but in addition to the rod I may use any other suitable fastening—for instance, I may use a bayonet-fastening, as shown in Fig. 2.

I shall construct the vessel A either of cast-iron or of wrought metal stamped in the proper shape, and so form the lapped joint *a* that it shall not allow the escape of the aroma of the coffee during the roasting process. I construct one of the hemispheres or halves with an opening through it to allow the introduction and removal of the coffee, which opening I provide with a suitable door, C, having a sliding catch, c, or other suitable fastening. If desired, a sliding door may be used instead of the hinged door C. The rod B passes diametrically through the vessel A, and is formed with a cranked handle, d, by which it is turned; also, with cranked or serpentine stirrers e inside of the vessel, so that by turning the rod the coffee in the vessel can be stirred or agitated, and the vessel itself oscillated, or, when desired, rotated.

It is obvious that when the crank-rod B is oscillated against a body of coffee in the vessel A the cranks e, acting against the coffee, will oscillate this vessel, and for the same reason when rod B is rapidly rotated the cranks will by pressing against the coffee cause the vessel to rotate.

I prefer to form the stirrers e by bending the rod B, as I have shown, although separately-formed stirrers may be secured to this rod. I apply a tube, f, loosely on that portion of the rod B which is between its stirrers and crank-handle, for a purpose hereinafter explained.

D designates a circular reversible base, which is made with collars and a flange. The skirting $g$ is designed to enter the smallest stove-plate holes, the annular flange $h$ resting upon the stove-plate when the base is in the position shown in Fig. 3. In this position the crank-rod B crosses the base, and is supported in vertical slots $i\ i$, formed in the double skirting $k$. The tube $f$ will in this position of the parts serve as a journal-bearing for the rod.

The flange $h$ rests upon the stove-plate, and so does the tube $f$, which affords a short bearing for the crank-rod, and relieves the latter from considerable friction. The skirting $k$ is designed to enter a stove-plate hole of larger diameter; or, by having lugs $n$ (shown in Fig. 3) on the edge of the skirting $k$ this skirting may be steadied on stove-plates having holes varying in size from the regular standard. The lugs $n$ will keep the base steady over the plate-hole. This base-support I prefer to make of cast-iron, and it will be seen that the slots $i\ i$ in skirting $k$ are so made that the base can be easily cast with these slots in it. If desired, I may have projections on the inner surfaces of the hemispheres for the crank-stirrers to strike against to facilitate oscillating or rotating the roasting-vessel, although I do not confine myself to the use of such projections or lugs.

The base-support D is not only reversible, as above described, but it will be seen by reference to Fig. 2 that it has an annular chamber, $q$, which serves, when the skirting $g$ is down, as in Fig. 3, as a heat-receptacle surrounding the coffee-vessel A. When the base D is arranged, as shown in Fig. 2, with the skirting $g$ up, there is also formed a heat-receptacle surrounding the vessel A above the flange $h$. In this last-named position of the base D the tube $f$ is shown supporting one end of the cranked rod. This tube $f$ lies in the slit which crosses the flange $h$ of the base D, and sustains the rod D parallel with the stove-plate.

Having described my invention, I claim—

1. The combination of the two-part roasting-vessel provided with a door and a cranked stirring-rod with double circular flanged base-support D, substantially as described.

2. The combination of the roasting-vessel, the cranked stirring-rod, its loose tube $f$, and the flanged base-support constructed with slots, substantially as described.

3. The reversible base-support D, consisting of the parts $g\ k$, of different diameters, a flange, $h$, and slots $i\ i$, substantially as described.

In testimony that I claim the foregoing I have hereunto set my hand this 13th day of August, 1881.

GEORGE A. BEIDLER.

Witnesses:
HENRY STEHMAN,
J. J. McCARTHY.